March 8, 1955

F. M. JOHNSON 2,703,417

DROPPABLE MARKER LIGHT

Filed Oct. 22, 1953

INVENTOR.
FRANCIS M. JOHNSON

March 8, 1955 F. M. JOHNSON 2,703,417
DROPPABLE MARKER LIGHT
Filed Oct. 22, 1953 3 Sheets-Sheet 3
Fig 5
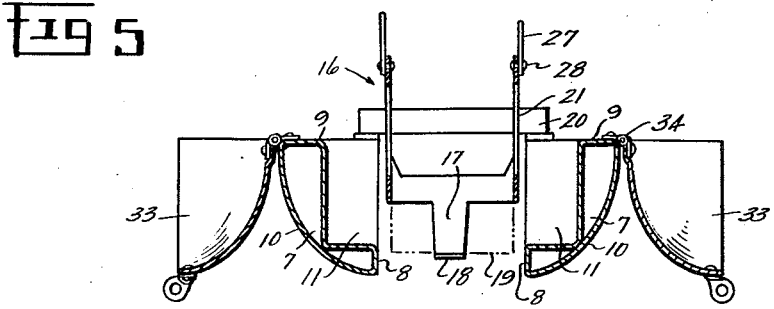
Fig 6
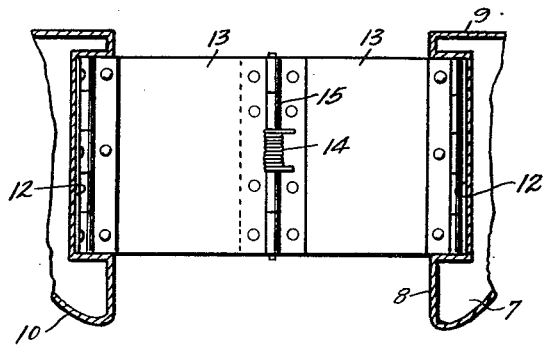
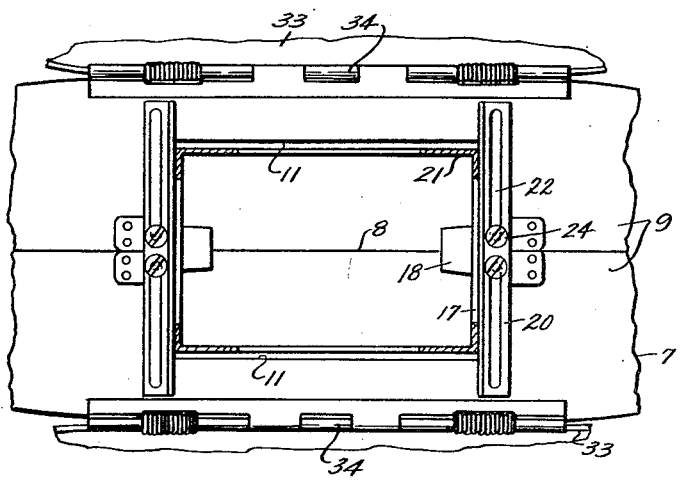
Fig 7
INVENTOR.
FRANCIS M. JOHNSON
BY
ATTORNEYS United States Patent Office 2,703,417
Patented Mar. 8, 1955

2,703,417

DROPPABLE MARKER LIGHT

Francis M. Johnson, Dayton, Ohio, assignor to the United States of America as represented by the Secretary of the Air Force Application October 22, 1953, Serial No. 387,811

11 Claims. (Cl. 9—8.3)

(Granted under Title 35, U. S. Code (1952), sec. 266)

The invention described herein may be manufactured and used by or for the Government for governmental purposes without payment to me of any royalty thereon.

This invention relates to signal devices and more particularly to a signal device adapted to be dropped from an aircraft and lowered by a parachute contained in the signal device supporting structure, having for an object the provision of a streamlined body of elongated form, somewhat circular in cross section, adapted to be hung from the bomb rack hangers of an aircraft and adapted to be released when desired, somewhat after the manner of a conventional bomb device.

A further object is the provision of a signal device having a pair of parallel juxtaposed elongated supports, with the signal device mounted therebetween, and including actuating means for automatically moving the elongated supports to a materially spaced parallel relation after release from the supporting aircraft to provide a wider supporting surface for the signal device when it lands.

A further object is the provision of a streamlined droppable signal device comprising a pair of similar elongated closed float members adapted to be maintained in juxtaposed parallel relation when carried on the bomb rack of an aircraft with their adjacent surfaces indented or recessed to carry a signal device such as an electric signal lamp therebetween having a limited slidable supporting connection with each of the float members and including automatic means for shifting the float members away from each to a predetermined spaced parallel relation to form a sort of a catamaran float structure with the signal device moved to a position mid way between opposite ends and adjacent sides of the float members.

A further object is the provision of a pair of complemental covers hinged to the outer sides of the float members to enclose the top of surfaces of the float members while the device is supported from the bomb suspension means of an aircraft, including means for automatically swinging the covers away from each other to open positions at the outer sides of the float members to expose the signal device.

A further object includes the provision of a parachute suspension lever arm or link pivoted to the device at opposite sides of the signal means to swing from a vertical suspension position during descent to a substantially horizontal position in which a suspension parachute is connected to the free end of the lever arm so that upon landing the lever arm is adapted to swing the connected end of the parachute toward the end of the float members and away from the signal means or marker light.

A further object includes the provision of a parachute which is attached to the lever arm and adapted to be retained in folded condition above the float members, lever arm and the signal means and retained in place by the separable covers, held closed until dropped from an aircraft and including static line means connected to the parachute at one end and to the supporting aircraft at the other end, with the static line extending out between the separable edges of the cover for deploying the parachute upon automatic release of the covers.

A further object is the provision of a signal device in the form of an electric signal marker light device having means for automatically energizing the signal device incident to the separation of the two elongated float members, whereby opening of the cover members release the parachute and separation of the float member lights the marker light, and including means for displacing the parachute toward one of the ends of the float members upon landing on water whereby the parachute is displaced longitudinally toward the end of the float members where it may act as a "sea anchor."

A further object is the provision of a streamlined elongated marker light device having a lower separable float section with a pair of complemental covers enclosing the upper surfaces of the float members and a marker light to provide a parachute containing compartment, in which the abutting complemental edges of the covers are formed with releasable interengaging retaining means adapted to be released when the device is dropped from an aircraft to automatically release the cover means for opening action to free the parachute for deploration and expose the marker light.

Other objects and advantages of the invention will become apparent from the following description and accompanying drawings in which like reference characters refer to like parts in the several figures.

Drawings

Figure 3:
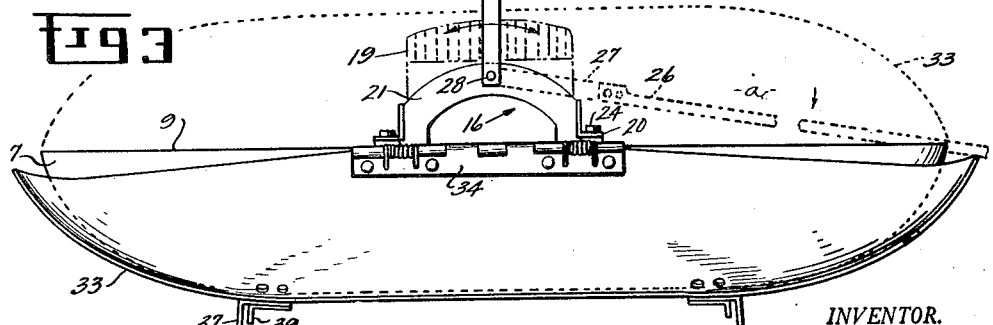

Fig. 3 is a side view, showing the signal marker device after release and in its open position, part of the sustaining parachute being broken away. Dotted lines show the same after landing and with the parachute sustaining lever swung toward the ends of the float members to displace the parachute out of its former sustaining position above the marker light. Dotted lines also show portions of the parachute shroud lines, where for instance the device has landed in water and the chute is utilized as a sea anchor.

Figure 4:
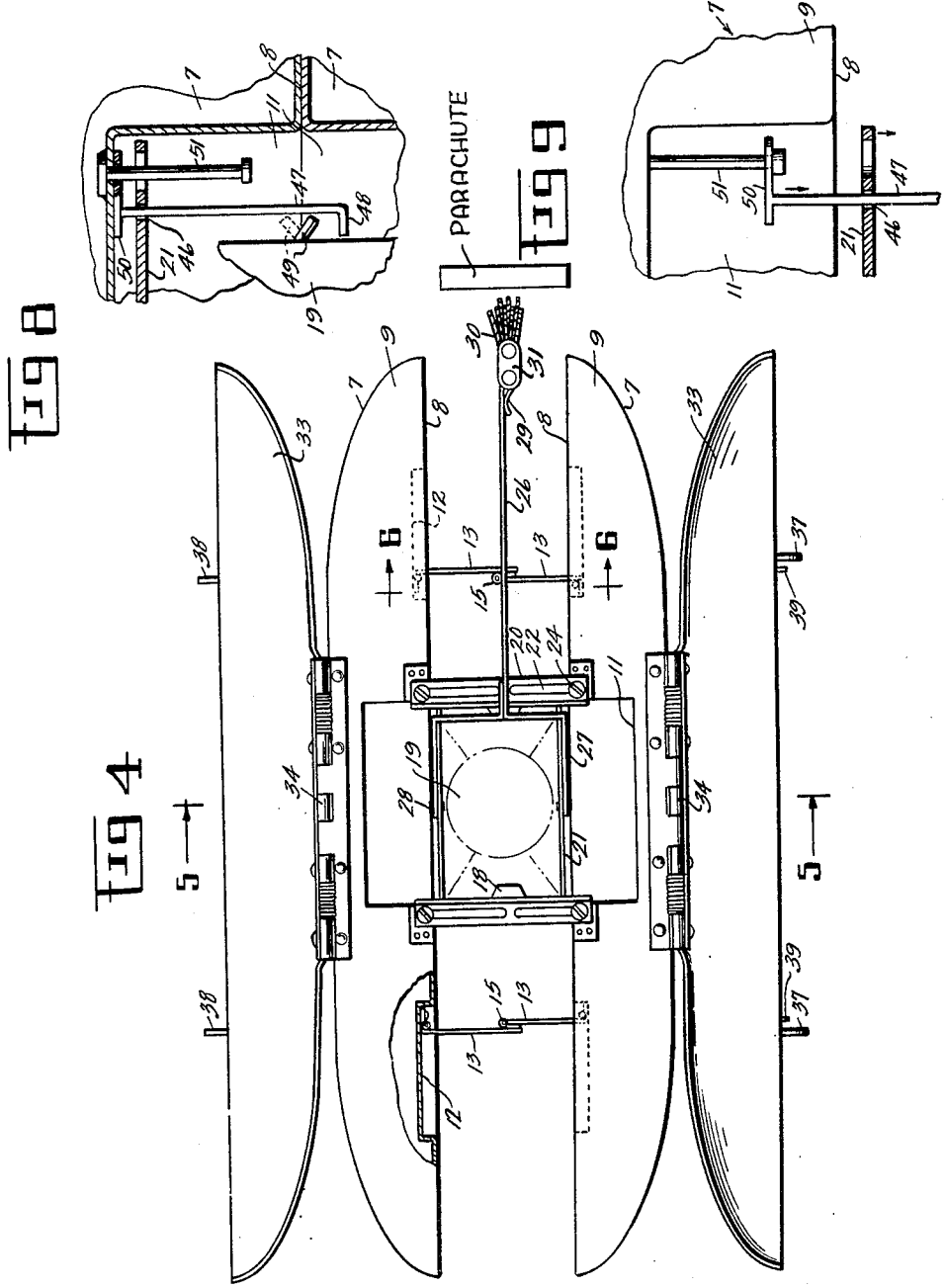

Fig. 4 is a top plan view of the device as illustrated in Fig. 3, more clearly illustrating certain specific details of construction.

Fig. 5 is a vertical section taken approximately on line 5—5 of Fig. 4.

Fig. 6 is a vertical section taken approximately on line 6—6 of Fig. 4.

Fig. 7 is an enlarged fragmentary detail view of the central portion of the float structure in non-extended relation and with the marker light structure removed.

Figs. 8 and 9 are fragmentary detail views showing one form of automatic switch means for closing the control switch to the marker light when the float members are separated and opening the switch circuit when the float members are in juxtaposed parallel relation.

Specification

Figure 1:
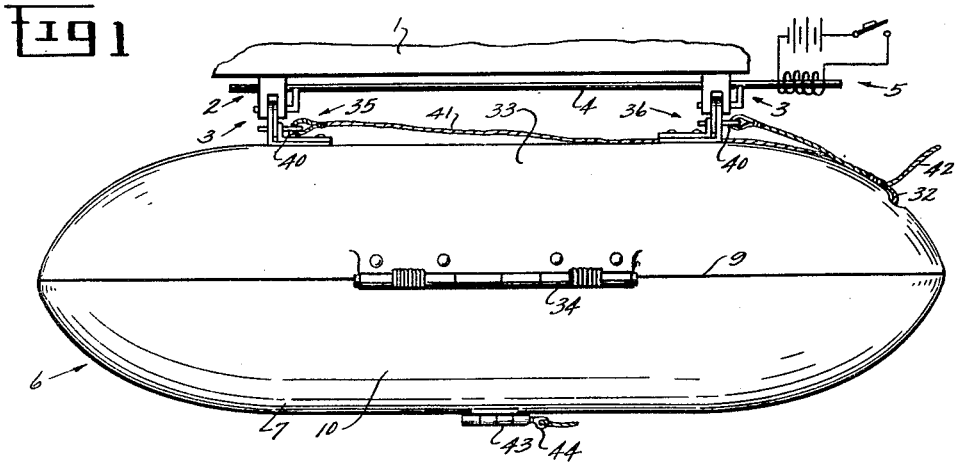
Fig. 1 is a side elevation of my improved droppable signal device, shown the same in closed condition and suspended from a supporting aircraft. The aircraft supporting arrangement is shown somewhat fragmentary and schematic.

Referring to Fig. 1 the reference numeral 1 indicates a portion of a supporting aircraft having a conventional bomb rack 2 comprising spaced shackles 3 and a release means 4 including an electromagnetic actuator such as a release actuating solenoid 5 arranged to be energized to release the shackles 3 and drop the bomb or other supported structure from the aircraft.

The reference numeral 6 indicates my improved droppable signal device generally, consisting more specifically of a streamlined body of somewhat circular cross section composed of a pair of elongated float members 7, each having vertical walls 8 and contiguous top surfaces 9 and intermediate curved outer walls 10. The vertical walls 8 of the two floats 7 are placed in juxtaposed side-by-side parallel relation as shown in Fig. 7, the adjacent sides 8 each having the large deep complemental recesses 11 formed therein, extending downwardly from the top surfaces and inwardly toward each other substantially mid way between the longitudinal ends of the float members.

At spaced points in the walls 8 at opposite sides of the recesses 11 are complemental shallow recesses 12 facing each other. Two pairs of toggle plates are provided therein, connected between the float members as indicated at 13—13 in Fig. 6, being provided with spring extension means 14, and pivoted at their outer ends to the bases of the recesses 12 and pivoted together at their centers at 15 where the spring means 14 is located. The toggle plates overlap each other at their centers to provide stop means when the toggle plates 13 are extended as seen in Fig. 4 to retain or "fix" the two float members 7 in the predetermined spaced parallel relation as shown. When the toggles are partially collapsed the float members 7 can be brought together with their walls 8 in juxtaposed parallel position, the toggle plates folding into the shallow recesses 12.

A signal device supporting basket structure is provided, comprising a rectangular frame 16 depending downwardly below the upper surfaces 9, intermediate the two large complemental recesses 11 with supporting arms 7 extending downwardly fore and aft, formed with bent supporting extremities 18 upon which the signal device, such as an electric marker light structure is placed, indicated at 19, retained in place by the confines of the basket-like frame 16. Laterally extending parallel end plates 20—20 form the front and rear portions of the structure 16, being connected together by the curved plates 21, curving upwardly above the level of the top surfaces 9 of the floats 7. The elongated end plates 20 are preferably angle plates having their bottom flanges extending across the top surfaces 9 and formed with aligned positioning slots 22 through which studs 24 project upwardly from the float members 7.

Upon release of the float members and spreading action therebetween by the toggle plates 13, the outer ends of the slots 22 engage the studs 24 to centralize the marker light supporting means or basket 16 over a median line between the two float members. Upon moving of the floats together the studs 24 engage the angle strips 20 at the inner ends, of the slots 22, centralizing the basket structure 16 between the opposite walls of the recesses 11.

A parachute sustaining lever or link 26 is provided, having its inner end bifurcated at 27 and pivoted at 28 to the curved side rails 21 of the basket structure 16. The outer end of the lever 26 is formed with a hooked extremity 29 to which a sustaining parachute 30 is attached (the upper canopy portion and part of the shroud lines being omitted). As shown, the load suspension end of the parachute is connected to the hooked portion 29 by a clevis connection 31, the parachute 30 having a light static line or break cord 32 connected at one end to its apex (not shown) and at its other end to the supporting aircraft structure 1.

The parachute suspension lever or link 26 is initially swung to the dotted line position *a* in Fig. 3, after which the shroud lines and connected parachute are folded or "packed" over the lever 26 and the marker light 19 and supported on the contiguous top surfaces 9—9 of the float members 7—7, the float members, of course, being moved into their juxtaposed parallel relation as shown in Fig. 7. The parachute 30 is confined in folded or packed condition on the top surfaces 9—9 between their outer sides and opposite ends by a pair of streamlined complemental cover members 33—33, seen in their closed position in Figs. 1 and 2 and in open position in Figs. 3 and 4.

The cover members 33 have a contiguous convex outer surface curvature, when closed to form with the outer surfaces of the float members a streamlined body, the lower edges of the covers following the contours of the outer edges of the float members at their upper of top surfaces and are hinged thereto, preferably by "piano" hinges 34 of appreciable lengths intermediate the fore and aft ends of the float members 7—7.

Figure 2:
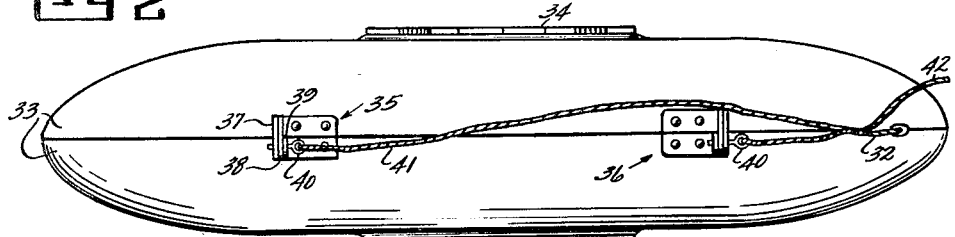
Fig. 2 is a top plan view of the device shown in Fig. 1 but eliminating the supporting aircraft structure.

The free or outer edges 35 of the two covers 7 are shaped to meet in a vertical plane midway between the adjacent vertical side walls of the float members 7 when in juxtaposed relation as shown in Fig. 2.

Located at spaced points toward the opposite ends of the covers 33 are complemental supporting brackets 35—36 comprising releasable retaining means for supporting the marker device at fore and aft spaced points from an aircraft and retaining the covers 33 and floats 77 respectively in closed and retracted positions. These supporting retainer brackets 35—36 each comprise a pair of apertured plates or eyes 37 and 38 disposed to overlap each other and align up for the reception of the bomb shackle release bolts of the supporting aircraft. The base plates for the respective eyes 37 and 38 are fixed on the two cover members adjacent their free edges as shown in Figs. 3 and 4, one of the brackets being formed with a bifurcated extremity to receive the bent extremity of the other plate therebetween but out of line with the shackle receiving overlapping eyes, the plates being apertured to receive a "safety" pin 40 therethrough to retain or "safety" the covers 33 in "closed" position.

A static line 41 may be connected to the "safety" pins 40, if desired, with its opposite end 42 extending to the supporting aircraft. This static line may be connected to the static line 32, previously described, with sufficient slack so that the pins 40 are pulled before the parachute static line is tensioned, giving the covers time to open, or it may be a separate line. If desired a releasable safety retainer 43 comprising overlapping aligned apertured brackets may be fixed to the bottoms of the float members 7 adjacent the edges of the vertical walls for receiving a pull pin 44 therethrough for retaining the lower adjacent edges of the two float members in juxtaposed relation. A static cord can connect the pull pin 44 to the static cord 42 so that all "safety" pins 40 and 44 are pulled simultaneously when the marker light signal structure is dropped (or before the device is dropped), since the supporting shackles will hold the covers closed while suspended thereon.

Upon release of the device from the bomb shackles 3 the covers 33 are swung to their open position as shown in Fig. 4 (providing the "safety" pins 40 and 44 are withdrawn). The static line 32 causes the movement of the suspension lever 26 to the position shown in Fig. 3, by reason of the extension of the parachute above the marker light, after which the line 32 is broken or released and the device falls free, suspended by the parachute.

Release of the covers 33 also permits the float members to spread under the influence of the toggle devices 22 to the position shown in Fig. 4.

Means are preferably provided to switch on the electric signal device or marker light when the covers 33 open and the float members 7 separate. One form of a switch operating mechanism is shown in Figs. 8 and 9 whereby when the floats 7—7 are brought together the signal control switch is moved to "off" position and separation of the floats move the switch to its "on" position.

Referring to Figs. 8 and 9, illustrating the floats 7—7 respectively in their juxtaposed and spaced positions, one of the curved side plates 21 of the signal device supporting basket is slotted at 46 to receive therethrough a shiftable switch actuator blade 47 having a laterally bent end 48 disposed to engage and actuate a switch lever 49 for turning on or off the electric signal device mounted in the basket structure 16 for instance the marker light of the structure 19. The opposite end of the blade 47 is formed with a laterally bent foot member 50 which is apertured to slide on a headed rod 51 fixed to and projecting outwardly from the base of the recess 11, the side plate 21 having a large aperture through which the rod 51 can pass, as seen in Fig. 8. When the floats 7 are moved toward each other, as the basket is shifted into the recesses 11, from position shown in Fig. 9 to the position in Fig. 8, the foot 50 strikes the base of the recess 11 and the bent extremity 48 forms a resilient abutment in the path of the switch lever 49, actuating the switch lever as it passes to switch off the signal light, the rod 51 passing through the large opening provided in the curved plate 21.

When the float members 7 move to their extended supporting position, the bent portion 48, having previously snapped over the end of the switch lever 49 as seen in Fig. 8 and is ready for engagement, being retained by the switch lever and slides in the guide opening 46 until the headed end of the rod 51 engages the foot 50. This moves the blade and bent end 48 to snap the switch lever 49 to its "on" position, after which the blade 47 flexes and the end 48 slides over the end of the switch lever 49 to its opposite side where it is ready to turn the light "off" when the floats 7 are again moved to their contracted positions.

After being released or dropped from an aircraft as mentioned above the suspension link 26 extends upwardly to the load suspension end of the parachute and the float members are extended and balanced so that they are horizontal during descent. Also the signal device has been activated through the switch device 49 incident to the separation of the float member 7, and in the event of a marker light the parachute will be illuminated during descent.

When the device is dropped, over water for instance, and lands the float members will firmly support the signal device therebetween and the elongated lever or connecting link 26 will swing toward the "downwind" end of the float members and the parachute, as it continues downward to the supporting (water) surface will be displaced by the link 27 over the "down wind" end of the float members into the water and will then act as a drag or "sea anchor," retarding the drift of the device caused by the wind. The device will remain floating with the signal or marker light in operation until picked up, or until its energizing battery is exhausted.

The foregoing description is not intended to limit the scope of the present invention which extends to all changes, modifications and equivalents within the scope of the appended claims.

I claim:

1. In an illuminated marker signal device adapted to be dropped from an aircraft while in flight and lowered by a parachute, a pair of elongated substantially streamlined supporting float members disposed in side-by-side relation, extensible retaining means connected between said float members for maintaining parallel relation between said float members during movement away from each other from a juxtaposed parallel side-by-side relation to a predetermined laterally spaced side-by-side parallel relation, said float members each having a complemental signal light receiving opening formed therein opening upwardly toward each other, whereby said float members when separated to said spaced relation to each other form a catamaran type of float structure with said signal light receiving openings located substantially centrally between the outer sides and opposite ends of the float members, an illuminated signal device supporting member slidably connected to each of said float members and extending downwardly intermediate said complemental signal device receiving openings, an illuminated marker signal device supported in said signal device supporting member and projecting above the upper surfaces of said float members, releasable holding means connecting said parallel float members together in parallel juxtaposed position, means connected to said releasable holding means for releasing the same, adapted to be connected at its other end to a supporting aircraft from which said device is to be dropped, and elongated parachute connecting means secured at one end to said illuminated signal device supporting member having connecting means at its opposite end for connecting a sustaining parachute thereto in upwardly spaced relation to the said float members and said illuminated marker signal device.

2. A droppable marker light structure comprising an elongated laterally separable float means, a marker light supported by said float means intermediate the opposite sides and ends thereof, elongated sustaining lever means pivotally connected at one end to said float means substantially midway between the opposite ends thereof adjacent the top surface of the float means at opposite sides of said marker light and swingable to dispose the outer end of the lever means adjacent one end of the float means, a sustaining parachute connected to said outer end of said lever means, adapted to be folded to lie on the upper surface of the float means above said marker light intermediate the outer sides and opposite ends thereof, elongated cover members connected at the outer sides of the float means and movable to a closed position enclosing and retaining said parachute on said float members in said folded condition, releasable securing means between said cover members for retaining said cover members in said closed position, means for opening said cover members upon release thereof by said releasable securing means to expose said parachute and expose said marker light, said releasable securing means connected to said cover members being constructed for attachment to a static line for moving the same to release said securing means, whereby when the marker light structure is dropped from an aircraft in flight to which the static line is attached the static line is thereby tensioned to release said releasable securing means, to permit said cover members to open and release the folded parachute for deployment, and suspension by said lever means of the float means and marker light during descent, whereby upon landing of the float means on a supporting surface the lever means is swingable about its pivot to displace the parachute connected end thereof away from above the marker light and toward one end of said float means, said attached parachute constituting a sea anchor for the float means when the float means lands in water.

3. A droppable marker light structure comprising, a marker light supporting receptacle, a pair of streamlined elongated catamaran-like float members adjustably connected to said supporting receptacle at opposite sides thereof for limited relative lateral movements toward and away from each other, each of the float members being formed with complemental recesses in the adjacent sides thereof for receiving said supporting receptacle therein with said adjacent sides of the float members in juxtaposed parallel relation, extensible connecting means between said float members for maintaining said float members in parallel relation and limiting lateral movement thereof between said juxtaposed parallel relation and a predetermined separated parallel position, including means normally urging said float members toward said separated parallel position, and retaining said float members in the latter position after movement thereof to said separated position, suspension lever means pivoted at opposite sides of said receptacle for swinging movement in a vertical plane intermediate the adjacent sides of the parallel float members to swing the free end of the lever means above the said receptacle toward one end of the float members, said float members having substantially contiguous upper surfaces when in the said juxtaposed parallel relation, a pair of complemental cover members each extending from the outer edge of each of the float members and curving upwardly from the opposite ends and outer sides of the upper surfaces of the float members, and hingedly connected adjacent their lower edges at spaced points to the float members adjacent their opposite side edges with their free edges disposed in abutting relation above the said adjacent sides of the float members when in closed position with said adjacent sides in said juxtaposed parallel relation, to provide complemental cooperating streamlined parachute enclosing separable covers located above the said supporting receptacle and the contiguous upper surfaces of said float members, releasable securing means connected between the abutting free edges of said cover members for releasably retaining the free edges of said cover members and adjacent sides of the said float members in said juxtaposed relations, means between said cover members and said float members for swinging said cover members away from each other to an open position upon release thereof, permitting lateral displacement of said float members away from each other, means for releasing said releasable securing means for movement to said release position, and a folded parachute positioned within said cover members on the said upper surfaces of the float members having shroud line suspension means connected at their lower ends to said free end of said suspension lever means, whereby upon release of said structure from an aircraft in flight, the cover members and float members are released and moved to their open and separated positions respectively to deploy the parachute for suspension of the said structure therefrom, and upon contact of the float members with a supporting medium said lever means is free to displace the end of the parachute connected thereto toward one end of said float members.

4. In a droppable marker light, a pair of elongated laterally separable parallel juxtaposed streamline supporting float members, extensible connecting means between said float members for automatically moving said float members to a predetermined laterally spaced parallel supporting relation position and retaining after separation in said predetermined spaced position, a marker light, supporting means therefore shiftably connected to both of said float members having means for positioning the marker light substantially midway between the adjacent sides and opposite ends of the float members when moved to predetermined spaced position, a pair of complemental streamlined cover members, each hinged at one edge at spaced points along the remote sides of the float members at the top edges thereof when the adjacent sides are in said juxtaposed position with the opposite edges of the cover members disposed in abutting relation, to provide hinged streamlined closure covers above the float members for enclosing said marker light, spring means for swinging said cover members on their hinged connections away from each other to an open position to expose the top surfaces of said float members and marker light, releasable retaining means between the cover members for retaining the same in abutting relation above the float members, and a sustaining parachute packed between the interior of said cover members and the top surfaces of said float members connected at its load suspension end to said float members.

5. Apparatus as claimed in claim 4 including means in said last mentioned connection for swinging the connected end of the sustaining parachute away from a position above the marker light and toward one end of the float members incident to relative movement of the connected parachute load suspension end toward said float mmebers.

6. In a droppable marker light, a plurality of laterally separable juxtaposed elongated streamlined float members, releasable connecting means between the float members for retaining the same in juxtaposed relation, resilient means between the float members for moving the float members to a predetermined spaced parallel supporting relation relative to each other, a pair of cover members extending upwardly and toward each other from the outer edges of the float members, with their opposite edges adapted to be disposed in abuting relation with the float members in said juxtaposed relation, spring means operable between said cover and float members for urging the cover members away from each other to open positions at opposite sides of the float members, releasable connecting means between the abutting edges of the cover members for retaining the same in said abutting relation, including complemental supporting means carried by the abutting edge portions of the cover members for supporting the float members from a supporting aircraft through said cover members, a parachute connected to the float members intermediate the ends thereof, packed between the float members and the cover members, adapted to be released for opening deployment upon opening of said cover members.

7. Apparatus as claimed in claim 6 including a sustaining lever pivoted at opposite sides of the marker light having a free end formed to lie on the supporting upper surfaces of the float members adjacent either end thereof, and said cover means comprises a pair of substantially identical complemental streamlined cover members having their upper edges extending in substantially contiguous contacting relation between the opposite ends of the float members to enclose the contiguous upper surfaces of the float members and the said marker light, and retain the parachute folded thereon and above the marker light, intermediate the opposite side edges and opposite ends of said upper surfaces and the inner surfaces of the complemental cover members and the upper surfaces of the float members.

8. Apparatus as claimed in claim 7 in which the supporting eye members are fixed to the cover members to lie in overlapping position when the covers are closed whereby to receive a bomb release shackle through each pair of overlapping eyes to support the device from an aircraft retaining the covers in closed position.

9. Apparatus as claimed in claim 7 in which the abutting edges of the covers are provided with complemental notches forming a static line opening, and the parachute has a deployment static line connected thereto extending through said opening and adapted to be connected to a supporting aircraft.

10. A droppable marker light structure comprising a pair of elongated complemental streamlined closed float members having parallel juxtaposed vertical inner side walls and contiguous top surfaces extending horizontally, and intermediate convex surfaces therebetween forming a pair of streamlined catamaran type floats having their adjacent vertical walls in juxtaposed vertical position, a pair of toggle-like hinge members connected between adjacent walls of the float members in longitudinally spaced relation thereon for controlling limited lateral movement between said float members from said juxtaposed position and an extended predetermined parallel relation including spring means between the toggle means for extending the toggle means to separate the float members, marker lamp supporting means having a pair of spaced rigid arms extending transversely across the contiguous top surfaces of the float members and slidably connected adjacent their opposite ends to the top surfaces of the float members at spaced points, a marker light carried by said marker light supporting means, a sustaining lever having a bifurcated end pivoted to the opposite sides of the marker light supporting means to swing above the marker light supporting means in a median plane extending vertically between the ends of the float members, a sustaining parachute connected at its load supporting end to the free end of the sustaining lever, and adapted to be folded to lie on the said supporting surfaces, and above said marker light, marker light supporting means and said sustaining lever while the lever is supported in a substantially horizontal position above the float members, separable cover means connected to the outer side edges of the float members for retaining the parachute on said float members in the folded condition aforesaid, means normally urging said cover means to an open position to free said parachute, releasable supporting and securing means between cover means for retaining said cover means closed in parachute retaining position and retaining said float members in said juxtaposed relation, means connected to said releasable securing means for releasing the same adapted to be connected to an aircraft for carrying and dropping the marker light structure, whereby to release said cover for opening to free the parachute and permit the parachute to open and suspend the structure during descent.

11. Apparatus as claimed in claim 10 including separable connecting means between the float members, and independent separable connecting means between the complemental edges of the complemental cover members for maintaining said float members in juxtaposed relation and holding said cover members in closed position, and static line release means connected adjacent one end to all of said separable connecting means and to the parachute adapted to be connected at its opposite end to an aircraft from which the marker light structure is to be dropped, whereby to release the cover means to free and withdraw the parachute for deployment, and to release the float members for separation therebetween whereby to form a substantial supporting surface for the marker light at the end of its descent.

References Cited in the file of this patent

UNITED STATES PATENTS

| 935,717 | Williams | Oct. 5, 1909 |
| 2,395,892 | Lontz | Mar. 5, 1946 |

FOREIGN PATENTS

| 507,907 | Great Britain | June 19, 1939 |